A. L. KOESTER.
WINDMILL.
APPLICATION FILED SEPT. 14, 1915.
1,263,326.
Patented Apr. 16, 1918.
2 SHEETS—SHEET 1.
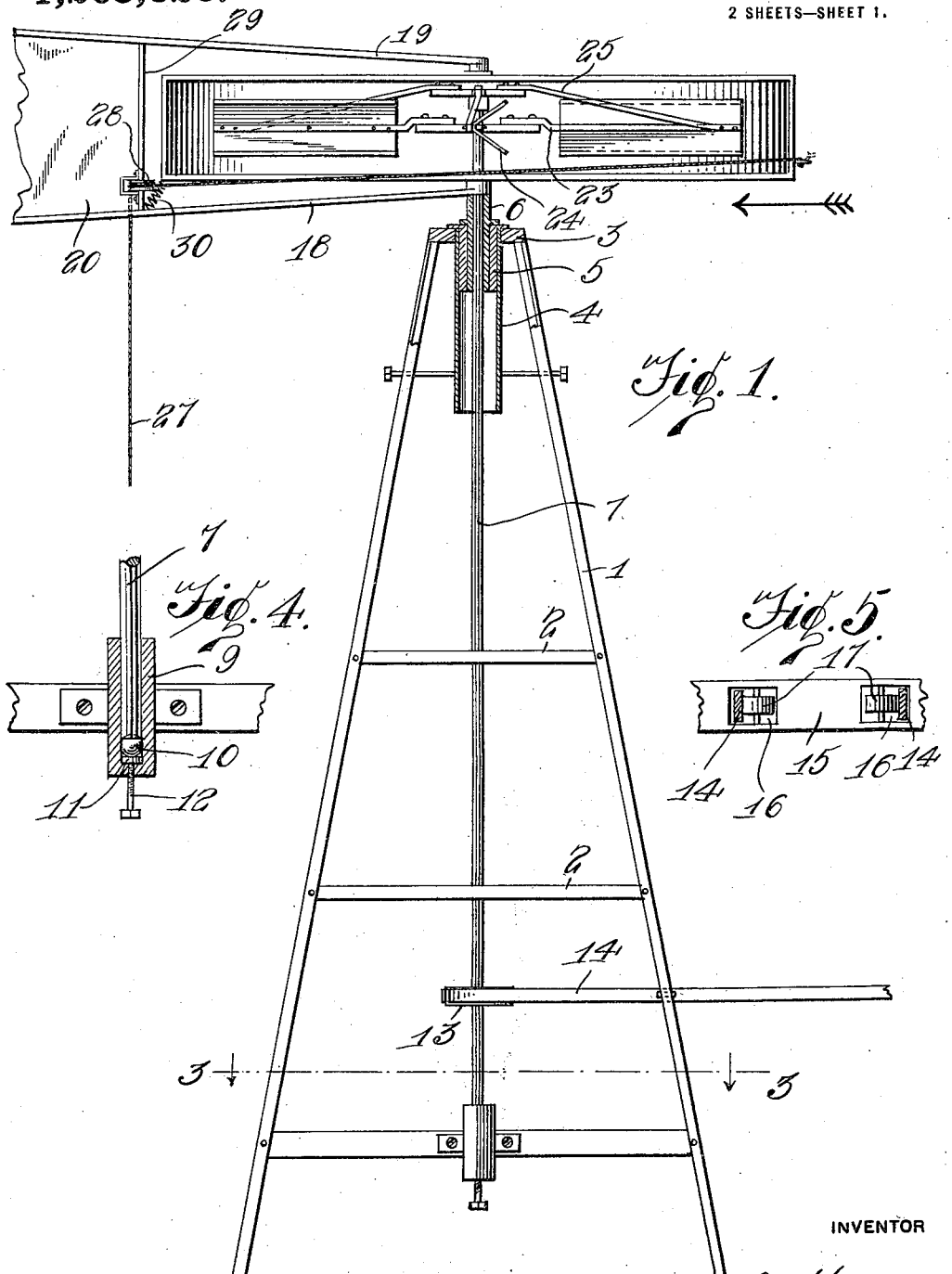
WITNESSES
INVENTOR
Anton L. Koester
BY
ATTORNEY A. L. KOESTER.
WINDMILL.
APPLICATION FILED SEPT. 14, 1915.
1,263,326.
Patented Apr. 16, 1918.
2 SHEETS—SHEET 2.
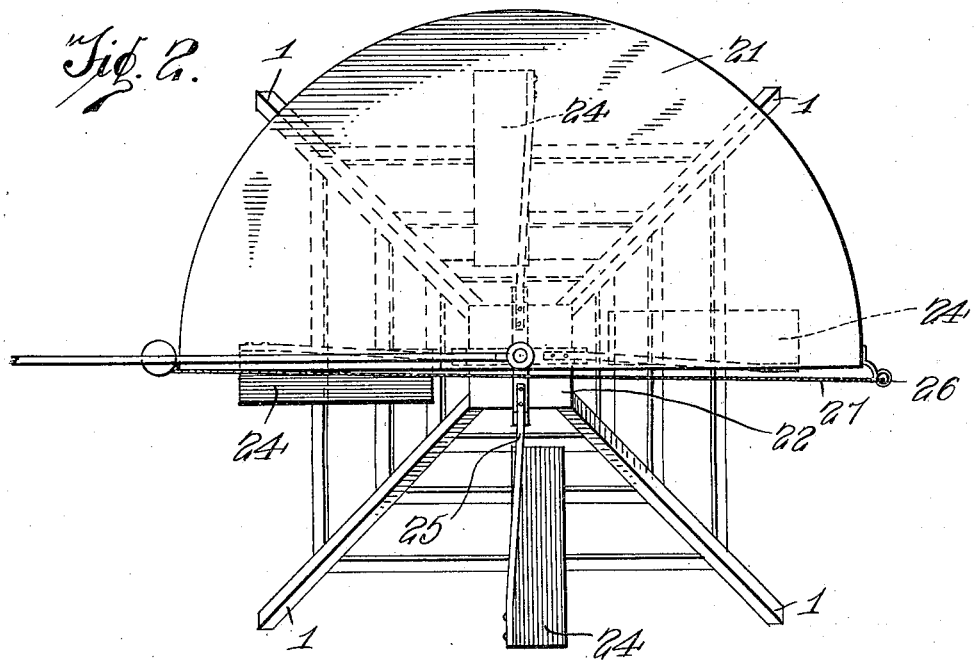
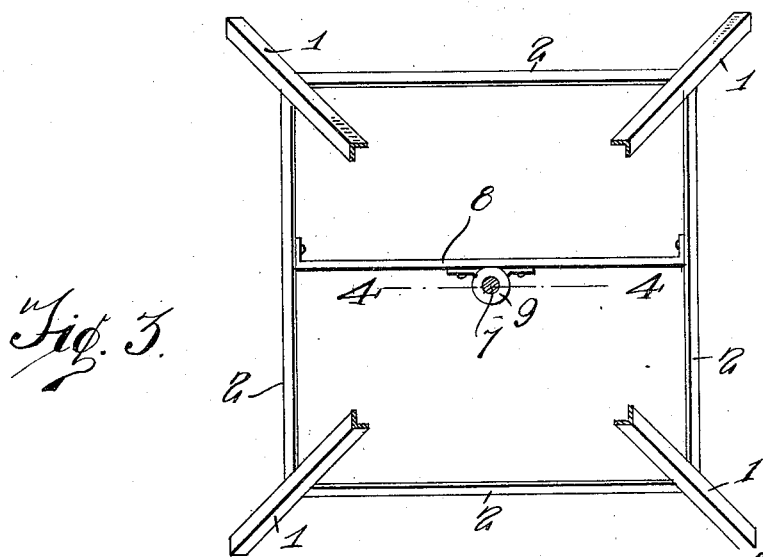
WITNESSES
C. R. Hardy
Benj. R. Newcomb
INVENTOR
Anton L. Koester
BY Richard B. Owen
ATTORNEY

UNITED STATES PATENT OFFICE.

ANTON L. KOESTER, OF GORHAM, KANSAS.

WINDMILL.

1,263,326.

Specification of Letters Patent.

Patented Apr. 16, 1918.

Application filed September 14, 1915. Serial No. 50,665.

*To all whom it may concern:*

Be it known that I, ANTON L. KOESTER, a citizen of the United States, residing at Gorham, in the county of Russell and State of Kansas, have invented certain new and useful Improvements in Windmills, of which the following is a specification.

My invention relates to a new and improved construction of wind mill and one object thereof is to provide means for regulating and controlling the action of the wind on the vane wheel so that the latter may be stopped if desired without being subject to the strain which would result by forcibly holding the vane wheel against rotation.

A further object is to provide a wind mill which includes a horizontally arranged vane wheel, the vanes of which are so constructed as to offer practically no resistance to the wind when the backs of the vanes are in position to receive the force of the wind.

A still further object resides in providing means for supporting the lower end of the vane wheel shaft, and also in providing means for guiding the belt driven from the said shaft.

With the above and other objects in view, I will now proceed to describe a specific embodiment of the invention as illustrated in the accompanying drawings forming a part of this specification, and in which:

Figure 1 is a side elevation of a wind mill constructed according to my invention, and with a portion thereof broken away, showing the details of construction.

Fig. 2 is a top plan view of the wind mill.

Fig. 3 is a sectional view on the line 3—3 of Fig. 1.

Fig. 4 is a sectional view on the line 4—4 of Fig. 3.

Fig. 5 is an elevation of the belt supporting and guiding means.

The wind mill comprises a frame structure which consists of the upright members 1 connected by cross members 2 and suitably braced in other ways. At the head of said structure is a plate 3 which carries a sleeve 4 having therein a bearing bushing 5. Said bearing bushing 5 accommodates a sleeve 6 through which the vertical shaft 7 extends and is journaled therein. At the bottom of the supporting structure is a central cross member 8 provided with a step-bearing 9 receiving the lower end of the shaft 7. In the bottom of the member of the step bearing 9 is a ball 10 which may be adjusted by means of the bushing 11 carried by the screw stem 12 threaded in the bottom of said step bearing member 9.

The shaft 7 carries a pulley 13 over which a belt 14 runs. In order to guide this belt a tie member 15 is apertured as at 16 and accommodates two rollers 17 having vertically disposed axes. The belt runs through these apertures and against the rollers 17.

At the top of the shaft 7 are located arms 18 and 19; the arm 18 being integral with the sleeve 6 whereas the inner end of the arm 19 forms a cap over the top of the shaft 7, and thus it will be seen that the said arms are rotatable independently of the shaft 7. These arms carry, at their outer ends, the direction indicating vane 20. Also carried by the upper end of the shaft 7 is a semi-circular shield 21 within which is located a vane wheel 22 which consists of the arms 23 carrying V-shaped vanes 24 which are so arranged that when the wind strikes the face of the vanes it will impart motion to the wheel 22 and the rear faces will offer little or no resistance to the wind due to the fact that the apex edge of the vane cuts through the air. The vanes are suitably braced by rods 25.

At one side the shield 21 carries an eyelet 26 with which a cable 27 is connected, and the other end of said cable extends over a pulley 28 carried by a rod 29 located on the direction indicating vane 20. It will be evident from the construction described in the foregoing paragraphs that both the direction indicating vane 20 and shield 21 are movable relative to each other. However, the said direction indicating vane 20 and shield 21 are connected by a coil spring 30 so as to bring the said shield and vane to a certain predetermined position relative to each other after they have been displaced.

Now in order to control the wind mill, the shield 21 is moved relative to the vane 20 by pulling the cable 27. Thus, if it is desired to stop the vane wheel from rotating which can be accomplished by shielding it from the current of wind, the cable 27 is pulled until it has moved the shield 21 to that position in which the wind cannot strike the vanes of the vane wheel. The proper location for this shield can be selected by reason of the fact that the direction indicating vane 20 always indicates the direction in which the wind is blowing.

As soon as the cable 27 is released the shield assumes its normal position relative to the direction indicating vane 20 which will expose the vanes to the action of the wind and will rotate the vane wheel to drive the shaft 7.

While, in the foregoing description and in the drawings, I have set forth a specific embodiment of the invention, it is to be understood that I do not limit myself to such construction except in so far as the appended claims import.

I claim:—

1. In a wind mill, a shaft, a wind wheel carried by said shaft, a shield rotatably mounted on said shaft and partially inclosing said wheel, a vane pivoted at one end upon said shaft, a cord connected at one end to one edge of said shield and passing across said shaft, a roller on the said vane intermediate the ends thereof over which said cord passes, and a contractile spring connecting the said vane and the adjacent edge of said shield whereby the said vane and shield will be yieldably held in one position.

2. In a wind mill, a vertical shaft, a sleeve on said shaft, a vane, a pair of spaced forwardly projecting arms on said vane, said arms at their extreme ends loosely inclosing said shaft and one of said arms resting on said sleeve, a wind wheel carried by said shaft between said arms, a semi-circular shield rotatably mounted on said shaft between said arms and being held by the latter, a roller on said vane at the juncture of the arms with the body of the latter, a cord secured to the edge of said shield remote from said roller and passing over said shaft and roller, and a contractile spring connecting said vane and the adjacent edge of said shield.

In testimony whereof I affix my signature in presence of two witnesses.

ANTON L. KOESTER.

Witnesses:
JOHN A. BAUMRUCKER,
JOHN BAUMRUCKER.

Copies of this patent may be obtained for five cents each, by addressing the "Commissioner of Patents, Washington, D. C."